United States Patent
Muratani et al.

(10) Patent No.: US 10,479,878 B2
(45) Date of Patent: Nov. 19, 2019

(54) ANTI-VIBRATION RUBBER COMPOSITION

(71) Applicant: Sumitomo Riko Company Limited, Komaki-shi, Aichi (JP)

(72) Inventors: Keiichi Muratani, Komaki (JP); Kenji Yamamoto, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days.

(21) Appl. No.: 15/432,276

(22) Filed: Feb. 14, 2017

(65) Prior Publication Data

US 2017/0152365 A1    Jun. 1, 2017

Related U.S. Application Data

(63) Continuation of application No. PCT/JP2015/059577, filed on Mar. 27, 2015.

(30) Foreign Application Priority Data

Sep. 29, 2014    (JP) .................................. 2014-198693

(51) Int. Cl.
| | | |
|---|---|---|
| *C08K 3/105* | (2018.01) | |
| *C08K 3/22* | (2006.01) | |
| *C08L 7/00* | (2006.01) | |
| *C08L 9/00* | (2006.01) | |
| *C08K 5/06* | (2006.01) | |
| *C08K 5/02* | (2006.01) | |
| *F16F 15/08* | (2006.01) | |
| *C08K 3/04* | (2006.01) | |
| *C08K 3/36* | (2006.01) | |
| *F16F 1/36* | (2006.01) | |

(52) U.S. Cl.
CPC .................. *C08K 5/06* (2013.01); *C08K 3/04* (2013.01); *C08K 3/22* (2013.01); *C08K 3/36* (2013.01); *C08K 5/02* (2013.01); *C08L 7/00* (2013.01); *C08L 9/00* (2013.01); *F16F 1/3605* (2013.01); *F16F 15/08* (2013.01); *C08K 3/105* (2018.01); *C08K 3/2279* (2013.01); *C08K 2003/2227* (2013.01); *C08K 2201/003* (2013.01); *C08L 2666/54* (2013.01); *F16F 2224/025* (2013.01)

(58) Field of Classification Search
None
See application file for complete search history.

(56) References Cited

U.S. PATENT DOCUMENTS 5,340,867 A * 8/1994 Yagawa .................. C08K 3/02
                                                           523/205
5,341,862 A    8/1994 Hashimoto et al.
7,144,941 B2  12/2006 Sauerwein et al.

FOREIGN PATENT DOCUMENTS

| JP | 55-127446 A | 10/1980 |
| JP | 7-166047 A | 6/1995 |
| JP | 2003-095646 A | 4/2003 |
| JP | 2005-146256 A | 6/2005 |
| JP | 2005-248155 A | 9/2005 |
| JP | 2005248155 A * | 9/2005 |
| JP | 2006-232981 A | 9/2006 |
| JP | 2008-169329 A | 7/2008 |
| JP | 2009-227695 A | 10/2009 |

OTHER PUBLICATIONS

Morley, J. "A New Generation of Submicron Flame Retardants and Smoke Suppressants and Their Potential Applications". Fire Retardant Chemicals Association. Compounding 2000—Issues, Solutions and Opportunities. CRC Press, Dec. 15, 1997. (Year: 1997).*
Product Information sheet for Si69. Evonik Industries AG. Nov. 2014. (Year: 2014).*
Extended (supplementary) European Search Report dated Jul. 27, 2017, issued in counterpart European Application No. 15845612.9. (6 pages).
International Search Report dated Jun. 30, 2015, issued in counterpart International Application No. PCT/JP2015/059577, w/English translation (4 pages).
Notification of Transmittal of Translation of the International Preliminary Report on Patentability (Form PCT/IB/338) issued in counterpart International Application No. PCT/JP2015/059577 dated Apr. 13, 2017, with Forms PCT/IB/373 and PCT/ISA/237. (5 pages).
Office Action dated Jul. 3, 2019, issued in counterpart CN Application No. 201580040291.X, with English translation (13 pages).

* cited by examiner

*Primary Examiner* — Richard A Huhn
(74) *Attorney, Agent, or Firm* — Westerman, Hattori, Daniels & Adrian, LLP

(57) ABSTRACT

Provided is an anti-vibration rubber composition, including: the following component (A); and the following components (B) and (C), in which a blending amount of the component (B) falls within a range of from 15 parts by weight to 60 parts by weight with respect to 100 parts by weight of the component (A), and a blending amount of the component (C) falls within a range of from 50 parts by weight to 150 parts by weight with respect thereto. Thus, the anti-vibration rubber composition is excellent in anti-vibration rubber properties, such as rubber physical properties and durability, and is excellent in flame retardancy. (A) A diene-based rubber. (B) A halogen-based flame retardant having a melting point of 150° C. or less. (C) Aluminum hydroxide having an average particle diameter of 0.75 μm or less.

16 Claims, No Drawings

ANTI-VIBRATION RUBBER COMPOSITION

RELATED APPLICATION

This application is a continuation of International Application No. PCT/JP2015/59577, filed on Mar. 27, 2015, which claims priority to Japanese Patent Application No. 2014-198693, filed on Sep. 29, 2014, the entire contents of each of which are hereby incorporated by reference.

TECHNICAL FIELD

The present disclosure relates to an anti-vibration rubber composition to be used in, for example, a vehicle, such as an automobile or a train, and more specifically, to an anti-vibration rubber composition to be used in, for example, a supporting function for an engine of an automobile or the like and an engine mount for suppressing vibration transmission.

BACKGROUND ART

An anti-vibration rubber composition has been generally used in an automobile for the purpose of reducing vibration or noise. The anti-vibration rubber composition is sometimes required to have, for example, flame retardancy as a property in addition to an anti-vibration property. A general approach to making a rubber flame-retardant is to add a flame retardant, such as a halogen-based flame retardant, a phosphorus-based flame retardant, or a metal hydroxide (see, for example, Patent Literatures 1 to 3).

RELATED ART DOCUMENT

Patent Document

PTL 1: JP-A-HEI7 (1995)-166047
PTL 2: JP-A-2005-146256
PTL 3: JP-A-2009-227695

SUMMARY OF INVENTION

However, the addition of such flame retardant as described above frequently causes a phenomenon in which rubber physical properties and durability are reduced. Accordingly, there occurs a problem in that in actuality, it is extremely difficult to improve a flame-retardant effect without impairing the physical properties and durability of the rubber serving as an anti-vibration rubber.

The present disclosure has been made in view of such circumstances, and an object is to provide an anti-vibration rubber composition that is excellent in anti-vibration rubber properties, such as rubber physical properties and durability, and is excellent in flame retardancy.

In order to achieve the above-mentioned object, according to one embodiment of the present disclosure, there is provided an anti-vibration rubber composition, including:
(A) a diene-based rubber;
(B) a halogen-based flame retardant having a melting point of 150° C. or less; and
(C) aluminum hydroxide having an average particle diameter of 0.75 μm or less,
in which a blending amount of the halogen-based flame retardant (B) falls within a range of from 15 parts by weight to 60 parts by weight with respect to 100 parts by weight of the diene-based rubber (A), and a blending amount of the aluminum hydroxide (C) falls within a range of from 50 parts by weight to 150 parts by weight with respect to 100 parts by weight of the diene-based rubber (A).

The inventors have made extensive investigations for solving the problem. In the course of the investigations, the inventors have obtained the following finding: a flame retardant that has heretofore been frequently used in a rubber field has a high melting point, and hence the flame retardant is present in a size of several micrometers in a rubber (vulcanized body), and the flame retardant serves as a starting point of rubber fracture to cause reductions in rubber physical properties and durability. In view of the foregoing, the inventors have made various experiments, and as a result, have found that when a diene-based rubber is blended with specific amounts of a halogen-based flame retardant having a low melting point (a melting point of 150° C. or less) and aluminum hydroxide having an average particle diameter of 0.75 μm or less, the problem can be entirely solved and hence the expected object can be achieved. Thus, the inventors have reached the present disclosure.

A possible reason why the object can be achieved by the construction is as described below. That is, the halogen-based flame retardant having a melting point of 150° C. or less easily melts at the time of the kneading of a rubber composition, and hence there is no risk in that the flame retardant serves as a starting point of rubber fracture, and the flame retardant is excellent in flame-retardant efficiency. In addition, the use of such low-melting point flame retardant reduces the Mooney viscosity of the entirety of the rubber composition, and hence even aluminum hydroxide reduced in particle diameter to have a large surface area can be uniformly dispersed in the rubber composition. It has been impossible to uniformly disperse aluminum hydroxide reduced in particle diameter as described above in a related-art anti-vibration rubber composition, and hence aluminum hydroxide having a large particle diameter has been used. However, the present disclosure can break through the technical common sense, and as a result, it may become possible to satisfactorily obtain not only improving effects on flame retardancy, durability, and the like exhibited by the flame retardant but also improving effects on rubber physical properties exhibited by the uniform dispersion of the aluminum hydroxide reduced in particle diameter having an average particle diameter of 0.75 μm or less.

As described above, the anti-vibration rubber composition is obtained by blending the diene-based rubber (component A) with specific amounts of the halogen-based flame retardant having a melting point of 150° C. or less (component B) and the aluminum hydroxide having an average particle diameter of 0.75 μm or less (component C). Accordingly, the anti-vibration rubber composition of the present disclosure is excellent in anti-vibration rubber properties, such as rubber physical properties and durability, and exhibits an excellent effect in terms of flame retardancy. In addition, the anti-vibration rubber composition can be suitably used as a material for an anti-vibration rubber member required to have flame retardancy, such as an engine mount, a stabilizer bush, or a suspension bush to be used in, for example, an automobile vehicle, or an anti-vibration rubber member in the field of building and housing.

DESCRIPTION OF EMBODIMENTS

Next, an embodiment of the present disclosure is described in detail.

An anti-vibration rubber composition of the present disclosure is obtained by blending a diene-based rubber (component A), a halogen-based flame retardant having a melting point of 150° C. or less (component B), and aluminum hydroxide having an average particle diameter of 0.75 µm or less (component C) at a specific ratio. The average particle diameter of the aluminum hydroxide is a volume-average particle diameter, and may be derived by, for example, using a sample arbitrarily sampled from a population and subjecting the sample to measurement with a laser diffraction/scattering particle size distribution-measuring apparatus. In addition, the average particle diameter of aluminum hydroxide to be used in each of Examples to be described later is also measured as described above.

Examples of the diene-based rubber (component A) include a natural rubber (NR), an isoprene rubber (IR), a butadiene rubber (BR), a styrene-butadiene rubber (SBR), an acrylonitrile-butadiene rubber (NBR), and an ethylene-propylene-diene-based rubber (EPDM). One kind of those rubbers may be used alone, or two or more kinds thereof may be used in combination. Of those, a natural rubber is suitably used in terms of strength and a reduction in dynamic-to-static modulus ratio.

Next, a halogen-based flame retardant having a melting point of 150° C. or less, preferably 120° C. or less is used as the low-melting point halogen-based flame retardant (component B) to be used together with the diene-based rubber (component A). Examples of such low-melting point halogen-based flame retardant include a bromine-based flame retardant and a chlorine-based flame retardant each having a low melting point as described above. One kind of those flame retardants may be used alone, or two or more kinds thereof may be used in combination.

Examples of the low-melting point bromine-based flame retardant include: aliphatic flame retardants, such as bis(dibromopropyl)tetrabromobisphenol A (DBP-TBBA), bis(dibromopropyl)tetrabromobisphenol S (DBP-TBBS), tris(dibromopropyl) isocyanurate (TDBPIC), and tris(tribromoneopentyl) phosphate (TTBNPP); and aromatic flame retardants, such as a brominated epoxy resin (TBBA epoxy).

In addition, examples of the low-melting point chlorine-based flame retardant include chlorinated paraffin and chlorinated polyethylene.

With respect to 100 parts by weight (hereinafter abbreviated as "part(s)") of the diene-based rubber (component A), the blending amount of the specific halogen-based flame retardant (component B) falls within the range of from 15 parts to 60 parts. That is, such range is adopted because of the following reasons: when the blending amount of the specific halogen-based flame retardant (component B) is excessively small, a desired flame-retardant effect or the like is not obtained; and in contrast, when the blending amount is excessively large, sight-blocking black smoke is generated by the combustion of the flame retardant, and the smoke causes reductions in physical properties of the composition.

Next, aluminum hydroxide having an average particle diameter of 0.75 µm or less, preferably aluminum hydroxide having an average particle diameter of 0.5 µm or less is used as the aluminum hydroxide (component C) to be used together with the diene-based rubber (component A) and the specific halogen-based flame retardant (component B). That is, more excellent rubber physical properties can be obtained by uniformly dispersing aluminum hydroxide that is reduced in particle diameter as described above and hence has a large surface area. The average particle diameter of the aluminum hydroxide is a volume-average particle diameter as described in the foregoing, and may be derived by, for example, using a sample arbitrarily sampled from a population and subjecting the sample to measurement with a laser diffraction/scattering particle size distribution-measuring apparatus.

The blending amount of the specific aluminum hydroxide (component C) falls within the range of from 50 parts to 150 parts, and preferably falls within the range of from 70 parts to 100 parts with respect to 100 parts of the diene-based rubber (component A). That is, such range is adopted because of the following reasons: when the blending amount of the specific aluminum hydroxide (component C) is excessively small, a desired flame-retardant effect is not obtained; and in contrast, when the blending amount is excessively large, reductions in rubber physical properties of the composition occur.

In the anti-vibration rubber composition, an antimony-based flame retardant, a reinforcing agent, a silane coupling agent, a vulcanizing agent, a vulcanization accelerator, a vulcanization aid, an antioxidant, a process oil, and the like may be appropriately blended as required together with the components A to C. In particular, the silane coupling agent is preferably blended because the rubber physical properties are strengthened by its synergistic effect with the specific aluminum hydroxide (component C).

The antimony-based flame retardant is, for example, antimony trioxide, and an antimony-based flame retardant having a particle diameter of 0.5 µm or less is preferred from the viewpoints of the flame-retardant effect and the rubber physical properties.

Examples of the reinforcing agent include carbon black, silica, and talc. One kind of those reinforcing agents may be used alone, or two or more kinds thereof may be used in combination.

The blending amount of the reinforcing agent preferably falls within the range of from 10 parts to 100 parts, and particularly preferably falls within the range of from 20 parts to 70 parts with respect to 100 parts of the diene-based rubber (component A). That is, such range is adopted because of the following reasons: when the blending amount is excessively small, a certain level of reinforceability cannot be satisfied; and in contrast, when the blending amount is excessively large, a problem, such as an increase in dynamic-to-static modulus ratio of the composition or the deterioration of the processability thereof due to an increase in viscosity thereof, occurs.

As the silane coupling agent, there may be used a sulfide-based, mercapto-based, amino-based, glycidoxy-based, nitro-based, or chloro-based silane coupling agent. A sulfide-based or mercapto-based silane coupling agent having high reactivity with rubber is particularly preferred. Specific examples thereof include: sulfide-based silane coupling agents, such as bis(3-triethoxysilylpropyl) tetrasulfide, bis(2-triethoxysilylethyl) tetrasulfide, bis(4-triethoxysilylbutyl) tetrasulfide, bis(3-trimethoxysilylpropyl) tetrasulfide, bis(2-trimethoxysilylethyl) tetrasulfide, bis(4-trimethoxysilylbutyl) tetrasulfide, bis(3-triethoxysilylpropyl) trisulfide, bis(2-triethoxysilylethyl) trisulfide, bis(4-triethoxysilylbutyl) trisulfide, bis(3-trimethoxysilylpropyl) trisulfide, bis(2-trimethoxysilylethyl) trisulfide, bis(4-trimethoxysilylbutyl) trisulfide, bis(3-triethoxysilylpropyl) disulfide, bis(2-triethoxysilylethyl) disulfide, bis(4-triethoxysilylbutyl) disulfide, bis(3-trimethoxysilylpropyl) disulfide, bis(2-trimethoxysilylethyl) disulfide, bis(4-trimethoxysilylbutyl) disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-triethoxysilylpropylmethacrylate monosulfide, and 3-trimethoxysilylpropylmethacrylate monosulfide; mercapto-based silane coupling agents, such as 3-mercaptopropyltrimethoxysilane, 3-mercaptopropyltriethoxysilane, 2-mercaptoethyltrimethoxysilane, and 2-mercaptoethyltriethoxysilane; vinyl-based silane coupling agents, such as vinyltriethoxysilane and vinyltrimethoxysilane; amino-based silane coupling agents, such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy-based silane coupling agents, such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro-based silane coupling agents, such as 3-nitropropyltrimethoxysilane and 3-nitropropyltriethoxysilane; and chloro-based silane coupling agents, such as 3-chloropropyltrimethoxysilane, 3-chloropropyltriethoxysilane, 2-chloroethyltrimethoxysilane, and 2-chloroethyltriethoxysilane.

In addition, the blending amount of the silane coupling agent preferably falls within the range of from 0.2 part to 20 parts, and more preferably falls within the range of from 0.5 part to 10 parts with respect to 100 parts of the diene-based rubber (component A).

The specific aluminum hydroxide (component C) is preferably treated with the silane coupling agent because the processability of the composition at the time of its kneading is improved and from the viewpoints of improvements in rubber physical properties.

Examples of the vulcanizing agent include sulfur (such as powder sulfur, precipitated sulfur, and insoluble sulfur). One kind of those agents may be used alone, or two or more kinds thereof may be used in combination.

The blending amount of the vulcanizing agent preferably falls within the range of from 0.3 part to 7 parts, and particularly preferably falls within the range of from 1 part to 5 parts with respect to 100 parts of the diene-based rubber (component A). That is, such range is adopted because of the following reasons: when the blending amount of the vulcanizing agent is excessively small, there is observed such a tendency that a sufficient crosslinked structure is not obtained and hence a dynamic-to-static modulus ratio and permanent set resistance are deteriorated; and in contrast, when the blending amount of the vulcanizing agent is excessively large, there is observed such a tendency that heat resistance is reduced.

Examples of the vulcanization accelerator include thiazole-, sulfenamide-, thiuram-, aldehyde ammonia-, aldehyde amine-, guanidine-, and thiourea-based vulcanization accelerators. One kind of those accelerators may be used alone, or two or more kinds thereof may be used in combination. Of those, a sulfenamide-based vulcanization accelerator is preferred because of its excellent crosslinking reactivity.

In addition, the blending amount of the vulcanization accelerator preferably falls within the range of from 0.5 part to 7 parts, and particularly preferably falls within the range of from 0.5 part to 5 parts with respect to 100 parts of the diene-based rubber (component A).

Examples of the thiazole-based vulcanization accelerator include dibenzothiazyl disulfide (MBTS), 2-mercaptobenzothiazole (MBT), sodium 2-mercaptobenzothiazole (NaMBT), and zinc 2-mercaptobenzothiazole (ZnMBT). One kind of those vulcanization accelerators may be used alone, or two or more kinds thereof may be used in combination. Of those, dibenzothiazyl disulfide (MBTS) and 2-mercaptobenzothiazole (MBT) are particularly suitably used because of its excellent crosslinking reactivity.

Examples of the sulfenamide-based vulcanization accelerator include N-oxydiethylene-2-benzothiazolylsulfenamide (NOBS), N-cyclohexyl-2-benzothiazolylsulfenamide (CBS), N-t-butyl-2-benzothiazolesulfenamide (BBS), and N,N'-dicyclohexyl-2-benzothiazolesulfenamide.

Examples of the thiuram-based vulcanization accelerator include tetramethylthiuram disulfide (TMTD), tetraethylthiuram disulfide (TETD), tetrabutylthiuram disulfide (TBTD), tetrakis(2-ethylhexyl)thiuram disulfide (TOT), and tetrabenzylthiuram disulfide (TBzTD).

Examples of the vulcanization aid include zinc flower (ZnO), stearic acid, and magnesium oxide. One kind of those vulcanization aids may be used alone, or two or more kinds thereof may be used in combination.

In addition, the blending amount of the vulcanization aid preferably falls within the range of from 1 part to 25 parts, and particularly preferably falls within the range of from 3 parts to 10 parts with respect to 100 parts of the diene-based rubber (component A).

Examples of the antioxidant include a carbamate-based antioxidant, a phenylenediamine-based antioxidant, a phenol-based antioxidant, a diphenylamine-based antioxidant, a quinoline-based antioxidant, an imidazole-based antioxidant, and waxes. One kind of those antioxidants may be used alone, or two or more kinds thereof may be used in combination.

In addition, the blending amount of the antioxidant preferably falls within the range of from 1 part to 10 parts, and particularly preferably falls within the range of from 2 parts to parts with respect to 100 parts of the diene-based rubber (component A).

Examples of the process oil include a naphthene-based oil, a paraffin-based oil, and an aromatic oil. One kind of those oils may be used alone, or two or more kinds thereof may be used in combination.

In addition, the blending amount of the process oil preferably falls within the range of from 1 part to 50 parts, and particularly preferably falls within the range of from 3 parts to parts with respect to 100 parts of the diene-based rubber (component A).

The anti-vibration rubber composition may be prepared, for example, as described below. That is, the diene-based rubber (component A), the specific halogen-based flame retardant (component B), and the specific aluminum hydroxide (component C), and as required, the reinforcing agent, the silane coupling agent, the antioxidant, the process oil, or the like are appropriately blended, the kneading of the materials is started with a Banbury mixer or the like at a temperature of about 50° C., and the kneading is performed at from 100° C. to 160° C. for from about 3 minutes to about 5 minutes. Next, the resultant is appropriately blended with the vulcanizing agent, the vulcanization accelerator, or the like, followed by kneading with an open roll under predetermined conditions (e.g., 60° C.×5 minutes). Thus, the anti-vibration rubber composition can be prepared. After that, the resultant anti-vibration rubber composition is vulcanized at a high temperature (of from 150° C. to 170° C.) for from 5 minutes to 60 minutes. Thus, an anti-vibration rubber (vulcanized body) can be obtained.

In addition, when the anti-vibration rubber composition is used as a material for an anti-vibration rubber as described above, the anti-vibration rubber is excellent in anti-vibration rubber properties, such as rubber physical properties and durability, and can provide an excellent effect in terms of flame retardancy. Accordingly, the anti-vibration rubber composition prepared as described above can be suitably used as a material for an anti-vibration rubber member required to have flame retardancy, such as an engine mount, a stabilizer bush, or a suspension bush to be used in, for example, an automobile vehicle, or an anti-vibration rubber member in the field of building and housing.

EXAMPLES

Next, Examples are described together with Comparative Examples. However, the present disclosure is not limited to these Examples.

First, prior to Examples and Comparative Examples, the following materials were prepared.

[NR]
Natural rubber
[ZnO]
Zinc flower
[Stearic Acid]
Beads stearic acid Sakura, manufactured by NOF Corporation
[Amine-Based Antioxidant]
OZONONE 6C, manufactured by Seiko Chemical Co., Ltd.
[Wax]
Microcrystalline wax (Sunnoc, manufactured by Ouchi Shinko Chemical Industrial Co., Ltd.)
[Aluminum Hydroxide (i)]
APYRAL 200SM (average particle diameter: 0.40 μm), manufactured by Nabaltec AG
[Aluminum Hydroxide (ii)]
HIGILITE H-43M (average particle diameter: 0.75 μm), manufactured by Showa Denko K.K.
[Aluminum Hydroxide (iii)]
HIGILITE H-42M (average particle diameter: 1.10 μm), manufactured by Showa Denko K.K.
[Carbon Black]
GPF-grade carbon black (SEAST V, manufactured by Tokai Carbon Co., Ltd.)
[Silica]
Wet silica (Nipsil VN3, manufactured by Tosoh Silica Corporation)
[Halogen-Based Flame Retardant]
Bromine-based flame retardant having a melting point of from 105° C. to 115° C. (FCP680G, manufactured by Suzuhiro Chemical Co., Ltd.)
[Antimony Trioxide]
PATOX-MF, manufactured by Nihon Seiko Co., Ltd.
[Naphthene Oil]
SUNTHENE 410, manufactured by Japan Sun Oil Company, Ltd.
[Silane Coupling Agent]
Si 69, manufactured by Evonik Degussa Corporation
[Vulcanization Accelerator]
Sulfenamide-based vulcanization accelerator (NOCCELER CZ-G, manufactured by Ouchi Shinko Chemical Industrial Co., Ltd.)
[Sulfur]
Manufactured by Karuizawa Refinery Example 1

100 Parts of the NR, 5 parts of ZnO, 2 parts of stearic acid, 1.5 parts of the amine-based antioxidant, 2 parts of the wax, 80 parts of the aluminum hydroxide (i), 40 parts of the carbon black, parts of the halogen-based flame retardant, 8 parts of antimony trioxide, and 5 parts of the naphthene oil were blended, and the materials were kneaded with a Banbury mixer at 140° C. for 5 minutes. Next, the resultant was blended with 2.3 parts of sulfur and 1.2 parts of the vulcanization accelerator, followed by kneading with an open roll at 60° C. for 5 minutes. Thus, an anti-vibration rubber composition was prepared.

Examples 2 to 6 and Comparative Examples 1 to 3

Anti-vibration rubber compositions were prepared in the same manner as in Example 1 except that the blending amounts of the respective components and the like were changed as shown in Table 1 to be described later.

The evaluations of respective properties were performed by using the anti-vibration rubber compositions of Examples and Comparative Examples thus obtained in accordance with the following criteria. The results are also shown in Table 1 to be described later.

[Dumbbell Fatigue Test]

Each of the anti-vibration rubber compositions was subjected to press molding (vulcanized) under the conditions of 150° C.×20 minutes to produce a rubber sheet having a thickness of 2 mm. Then, a JIS No. 3 dumbbell was punched out of the rubber sheet, and a dumbbell fatigue test (elongation test) was performed by using the dumbbell in conformity with JIS K 6260. Then, such a dumbbell that the number of times of elongation at the time of its rupture was 50,000 or more was evaluated as "○", such a dumbbell that the number of times of elongation at the time of the rupture was 20,000 or more and less than 50,000 was evaluated as "Δ", and such a dumbbell that the number of times of elongation at the time of the rupture was less than 20,000 was evaluated as "x".

[Light Permeability Test]

Each of the anti-vibration rubber compositions was subjected to press molding (vulcanized) under the conditions of 150° C.×60 minutes to produce a 76.2-millimeter square rubber block having a thickness of 25.4 mm. Then, in order for the flame retardancy of the rubber block to be evaluated, the light permeability of smoke produced at the time of the combustion of the rubber block was measured in conformity with ASTM E662. That is, such a rubber block that the Ds value (specific optical density) of the smoke 4 minutes after the initiation of heating in a non-flaming or flaming test was less than 200 was evaluated as "○", such a rubber block that the Ds value was 200 or more and less than 300 was evaluated as "Δ", and such a rubber block that the Ds value was 300 or more was evaluated as "x".

[Oxygen Index]

Each of the anti-vibration rubber compositions was subjected to press molding (vulcanized) under the conditions of 150° C.×20 minutes to produce a rubber sheet having a thickness of 2 mm. Then, in order for the ease with which the rubber sheet burned to be evaluated, the minimum oxygen concentration (vol %) necessary for maintaining the combustion of the rubber sheet was measured in conformity with JIS K 7201. Then, a rubber sheet having an oxygen index of 21 or more was evaluated as "○", and a rubber sheet having an oxygen index of less than 21 was evaluated as "x".

[Anti-Vibration Performance]

Each of the anti-vibration rubber compositions was subjected to press molding (vulcanized) under the conditions of 150° C.×30 minutes to produce a test piece of a cylindrical shape (having a diameter of 50 mm and a height of 25 mm). A circular metal fitting (having a diameter of 60 mm and a thickness of 6 mm) was mounted on each of the upper surface and lower surface of the test piece, and its dynamic spring constant (Kd100) and static spring constant (Ks) were each measured in conformity with JIS K 6394. A dynamic-to-static modulus ratio (Kd100/Ks) was calculated on the basis of the resultant values. Then, a test piece having a dynamic-to-static modulus ratio serving as an indicator of anti-vibration performance of 5 or less was evaluated as "○", and a test piece having a dynamic-to-static modulus ratio of more than was evaluated as "x".

TABLE 1

(Part(s) by weight)

|  | Example | | | | | | Comparative Example | | |
|---|---|---|---|---|---|---|---|---|---|
|  | 1 | 2 | 3 | 4 | 5 | 6 | 1 | 2 | 3 |
| NR | 100.0 | 100.0 | 100.0 | 100.0 | 100.0 | 100.0 | 100.0 | 100.0 | 100.0 |
| ZnO | 5.0 | 5.0 | 5.0 | 5.0 | 5.0 | 5.0 | 5.0 | 5.0 | 5.0 |
| Stearic acid | 2.0 | 2.0 | 2.0 | 2.0 | 2.0 | 2.0 | 2.0 | 2.0 | 2.0 |
| Amine-based antioxidant | 1.5 | 1.5 | 1.5 | 1.5 | 1.5 | 1.5 | 1.5 | 1.5 | 1.5 |
| Wax | 2.0 | 2.0 | 2.0 | 2.0 | 2.0 | 2.0 | 2.0 | 2.0 | 2.0 |
| Aluminum hydroxide  i | 80.0 | — | 80.0 | 60.0 | 110.0 | 80.0 | — | — | — |
| ii | — | 80.0 | — | — | — | — | — | — | — |
| iii | — | — | — | — | — | — | — | — | 80.0 |
| Carbon black | 40.0 | 40.0 | — | 40.0 | 40.0 | 40.0 | 40.0 | 40.0 | 40.0 |
| Silica | — | — | 20.0 | — | — | — | — | — | — |
| Halogen-based flame retardant | 20.0 | 20.0 | 20.0 | 20.0 | 20.0 | 20.0 | — | 20.0 | 20.0 |
| Antimony trioxide | 8.0 | 8.0 | 8.0 | 8.0 | 8.0 | 8.0 | — | 8.0 | 8.0 |
| Naphthene oil | 5.0 | 5.0 | 5.0 | 5.0 | 5.0 | 5.0 | 5.0 | 5.0 | 5.0 |
| Silane coupling agent | — | — | — | — | — | 2.0 | — | — | — |
| Vulcanization accelerator | 1.2 | 1.2 | 1.2 | 1.2 | 1.2 | 1.2 | 1.2 | 1.2 | 1.2 |
| Sulfur | 2.3 | 2.3 | 2.3 | 2.3 | 2.3 | 2.3 | 2.3 | 2.3 | 2.3 |
| Dumbbell fatigue test | ○ | ○ | ○ | ○ | Δ | ○ | ○ | ○ | x |
| Light permeability test | ○ | ○ | ○ | Δ | ○ | ○ | x | x | ○ |
| Oxygen index | ○ | ○ | ○ | ○ | ○ | ○ | x | ○ | ○ |
| Anti-vibration performance | ○ | ○ | ○ | ○ | ○ | ○ | ○ | ○ | ○ |

As can be seen from the foregoing results, the rubber compositions of Examples are superior in anti-vibration property and durability (the dumbbell fatigue test) to the rubber compositions of Comparative Examples, and provide more excellent effects in the flame retardancy evaluations (the light permeability test and the oxygen index) than the rubber compositions of Comparative Examples do.

In Examples described above, specific embodiments in the present disclosure have been described. However, Examples described above are merely illustrative and should not be construed as being limitative. Various modifications apparent to a person skilled in the art are meant to be within the scope of the present disclosure.

The anti-vibration rubber composition of the present disclosure is excellent in anti-vibration rubber properties, such as rubber physical properties and durability, and can provide an excellent effect in terms of flame retardancy. Accordingly, the anti-vibration rubber composition of the present disclosure can be suitably used as a material for an anti-vibration rubber member required to have flame retardancy, such as an engine mount, a stabilizer bush, or a suspension bush to be used in, for example, an automobile vehicle, or an anti-vibration rubber member in the field of building and housing.

The invention claimed is:

1. An anti-vibration rubber composition, comprising:
   (A) a diene-based rubber;
   (B) a halogen-based flame retardant having a melting point of 150° C. or less; and
   (C) aluminum hydroxide having an average particle diameter of 0.4 μm or less,
   wherein a blending amount of the halogen-based flame retardant (B) falls within a range of from 15 parts by weight to 60 parts by weight with respect to 100 parts by weight of the diene-based rubber (A), and a blending amount of the aluminum hydroxide (C) falls within a range of from 50 parts by weight to 150 parts by weight with respect to 100 parts by weight of the diene-based rubber (A).

2. The anti-vibration rubber composition according to claim 1, further comprising a silane coupling agent.

3. The anti-vibration rubber composition according to claim 2, wherein the silane coupling agent comprises at least one of sulfide-based silane coupling agent and mercapto-based silane coupling agent.

4. The anti-vibration rubber composition according to claim 2, wherein a blending amount of the silane coupling agent falls within a range of from 0.2 part by weight to 20 parts by weight with respect to 100 parts by weight of the diene-based rubber (A).

5. The anti-vibration rubber composition according to claim 1, wherein the diene-based rubber (A) comprises at least one selected from the group consisting of a natural rubber, an isoprene rubber, a butadiene rubber, a styrene-butadiene rubber, an acrylonitrile-butadiene rubber, and an ethylene-propylene-diene-based rubber.

6. The anti-vibration rubber composition according to claim 1, wherein the halogen-based flame retardant (B) comprises a halogen-based flame retardant having a melting point of 120° C. or less.

7. The anti-vibration rubber composition according to claim 1, wherein the halogen-based flame retardant (B) comprises at least one of a bromine-based flame retardant and a chlorine-based flame retardant.

8. The anti-vibration rubber composition according to claim 7, wherein the bromine-based flame retardant comprises at least one selected from the group consisting of bis(dibromopropyl)tetrabromobisphenol A, bis(dibromopropyl)tetrabromobisphenol S, tris(dibromopropyl) isocyanurate, tris(tribromoneopentyl) phosphate, and a brominated epoxy resin.

9. The anti-vibration rubber composition according to claim 7, wherein the chlorine-based flame retardant comprises at least one of chlorinated paraffin and chlorinated polyethylene.

10. The anti-vibration rubber composition according to claim 1, wherein the blending amount of the aluminum hydroxide (C) falls within a range of from 70 parts by weight to 100 parts by weight with respect to 100 parts by weight of the diene-based rubber (A).

11. The anti-vibration rubber composition according to claim 1, wherein the blending amount of the aluminum hydroxide (C) falls within a range of from 70 parts by weight to 80 parts by weight with respect to 100 parts by weight of the diene-based rubber (A).

12. The anti-vibration rubber composition according to claim 1, further comprising an antimony-based flame retardant.

13. The anti-vibration rubber composition according to claim 12, wherein the antimony-based flame retardant comprises an antimony-based flame retardant having a particle diameter of 0.5 µm or less.

14. The anti-vibration rubber composition according to claim 1, wherein the anti-vibration rubber composition further comprises a reinforcing agent which comprises at least one of carbon black and silica.

15. The anti-vibration rubber composition according to claim 14, wherein a blending amount of the reinforcing agent falls within a range of from 10 parts by weight to 100 parts by weight with respect to 100 parts by weight of the diene-based rubber (A).

16. A vulcanized body of the anti-vibration rubber composition of claim 1.

* * * * *